United States Patent
Takizawa

(10) Patent No.: US 9,060,114 B2
(45) Date of Patent: Jun. 16, 2015

(54) IMAGE PROCESSING DEVICE AND IMAGE PROCESSING METHOD FOR EXECUTING IMAGE PROCESSING TO DETECT OBJECT IN IMAGE

(71) Applicant: FANUC CORPORATION, Yamanashi (JP)

(72) Inventor: Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/139,611

(22) Filed: Dec. 23, 2013

(65) Prior Publication Data

US 2014/0176761 A1 Jun. 26, 2014

(30) Foreign Application Priority Data

Dec. 25, 2012 (JP) .................. 2012-281662

(51) Int. Cl.
*H04N 5/228* (2006.01)
*H04N 5/225* (2006.01)
*H04N 5/232* (2006.01)
*H04N 5/235* (2006.01)
*G06T 5/00* (2006.01)

(52) U.S. Cl.
CPC ......... *H04N 5/2256* (2013.01); *H04N 5/23229* (2013.01); *H04N 5/2354* (2013.01); *G06T 5/008* (2013.01)

(58) Field of Classification Search
CPC . H04N 5/2256; H04N 5/2354; H04N 5/2351; H04N 5/23229; G01N 21/8806; G06T 5/008
See application file for complete search history.

(56) References Cited

U.S. PATENT DOCUMENTS

| 8,098,928 B2 | 1/2012 | Ban et al. |
| 8,212,871 B2 | 7/2012 | Tonogai et al. |
| 8,295,975 B2 | 10/2012 | Arimatsu et al. |

FOREIGN PATENT DOCUMENTS

| JP | 04-032381 | | 2/1992 |
| JP | 7301513 | A | 11/1995 |
| JP | 8320929 | A | 12/1996 |
| JP | 10154014 | A | 6/1998 |
| JP | 20053410 | A | 1/2005 |
| JP | 4309439 | B2 | 8/2009 |
| JP | 2010-134915 | A | 6/2010 |
| JP | 4565023 | B2 | 10/2010 |

*Primary Examiner* — Paul Berardesca
(74) *Attorney, Agent, or Firm* — Lowe Hauptman & Ham, LLP

(57) ABSTRACT

An imaging command unit commands an imaging device to image an object projected with a shaded image where a predetermined shade value is set with respect to each pixel. An image acquisition unit acquires a shaded image imaged by the imaging device in accordance with a command of the imaging command unit. An image production unit produces a shaded image where any of shade values is set with respect to each pixel so as to have a brightness distribution opposite to a brightness distribution of the shaded image. An imaging command unit commands the imaging device to image the object projected with the shaded image. The image acquisition unit acquires a shaded image imaged by the imaging device in accordance with a command of the imaging command unit. An object information acquisition unit acquires information on the object in the shaded image based on the shaded image.

8 Claims, 4 Drawing Sheets

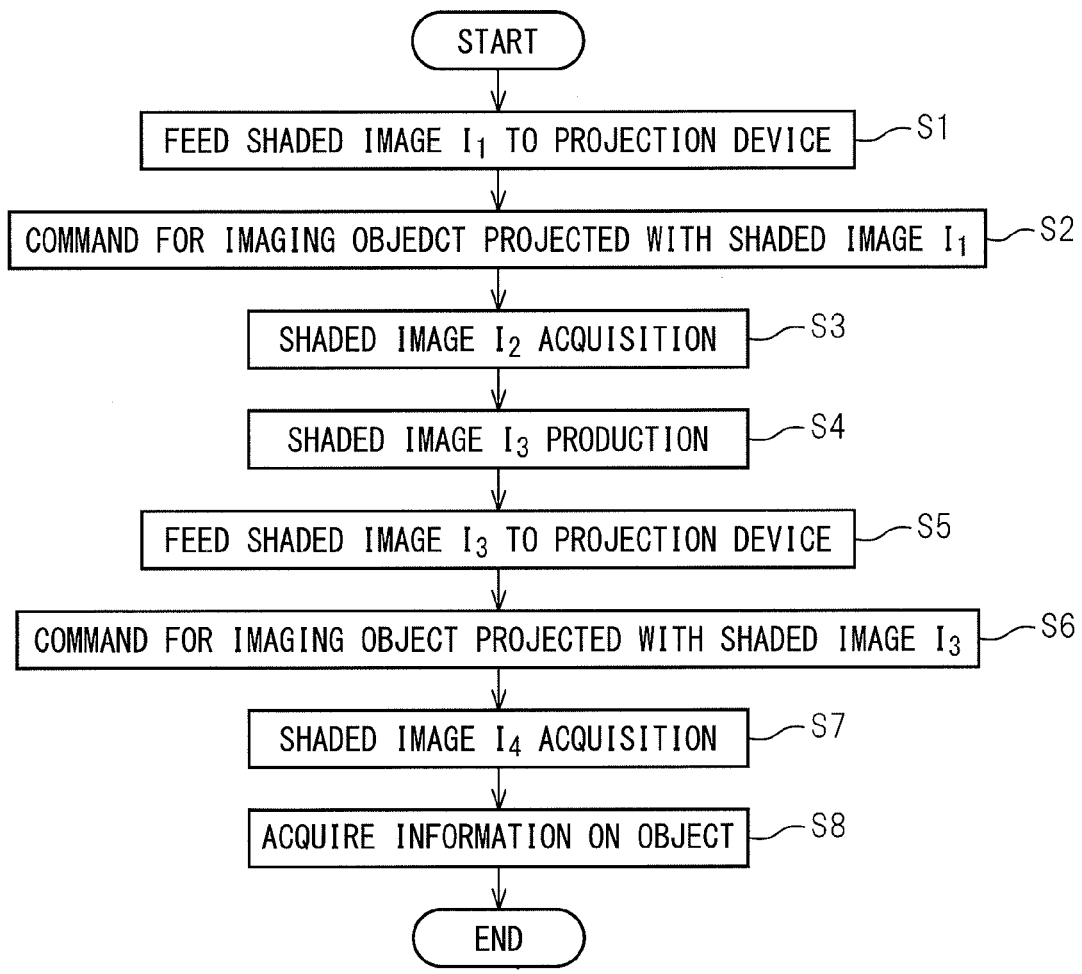

IMAGE PROCESSING DEVICE AND IMAGE PROCESSING METHOD FOR EXECUTING IMAGE PROCESSING TO DETECT OBJECT IN IMAGE

This application is a new U.S. patent application that claims benefit of JP 2012-281662, filed on Dec. 25, 2012, the content of JP 2012-281662 is incorporated herein by reference.

FIELD OF THE INVENTION

The present invention relates to an image processing device and an image processing method for executing image processing to detect an object in an image imaged by an imaging device.

BACKGROUND OF THE INVENTION

JP-B-4309439 and JP-B-4565023, for example, have proposed a system for picking up an object using a robot, which initially images, using an imaging device, a state where a plurality of objects (for example, components) is randomly piled up. Subsequently, the system detects one of the plurality of objects based on an image imaged by the imaging device. Then, the system picks up the detected object using a robot. In such a system, an object makes various faces (front surface, rear surface, or side surface) thereof face an imaging surface of an imaging device (hereinafter, referred to as an "imaging surface"). The brightness of an object contained in an image imaged by the imaging device (hereinafter, referred to as the "brightness of an object") in the case where a face of the object is parallel to the imaging surface is larger than in the case where the face of the object is not parallel to the imaging surface (for example, a case where the face of the object is inclined to the imaging surface). Since various faces of the object face the imaging surface, the brightness of the object varies. As a result, it is difficult to detect the object in some cases.

For example, when the face of the object is parallel to the imaging surface, most of light having entered the object from an illuminating device or the like is reflected in a direction toward the imaging surface. As a result, most of light having been reflected from the object enters the imaging surface. Therefore, the brightness of the object increases and then halation occurs in an image, resulting in a possibility of difficulty in detection of the object. On the other hand, when the face of the object is not parallel to the imaging surface (for example, when the face of the object is inclined to the imaging surface), most of light having entered the face of the object from the illuminating device or the like is reflected to a direction other than the imaging surface. As a result, most of light having been reflected from the object does not enter the imaging surface. Therefore, the brightness of the object decreases, resulting in a possibility of difficulty in detection of the object. In this manner, the brightness of the object varies with a ratio where light reflected from the object enters the imaging surface.

On the other hand, there have been proposed devices for avoiding a situation where the brightness of an object excessively increases due to the fact that the face of the object is parallel to the imaging surface and a situation where the brightness of the object excessively decreases due to the fact that the face of the object is inclined to the imaging surface. JP-A-4-32381, for example, has proposed an imaging device for acquiring an image having large dynamic range, for example, via exposure performed for a plurality of exposure times, and JP-A-2010-134915, for example, has proposed an image processing device for generating an image having large dynamic range from a plurality of images acquired via imaging performed for a plurality of exposure times.

However, the conventional imaging device and image processing device have a problem that a difference in the brightness of an object, in other words, the contrast of an image decreases, resulting in difficulty in detecting the object.

An object of the present invention is to provide an image processing device and an image processing method in which the brightness of an object does not vary according to an orientation of the object without a decrease in the contrast of an image imaged by an imaging device.

SUMMARY OF THE INVENTION

The image processing device according to the present invention is an image processing device for executing image processing to detect an object in an image imaged by an imaging device, the image processing device including an imaging command unit for commanding the imaging device to image the object; an image acquisition unit for acquiring a first image imaged by the imaging device in accordance with a command of the imaging command unit; an image production unit for producing a second image where any of shade values is set with respect to each pixel so as to have a brightness distribution opposite to a brightness distribution of the first image, based on the first image; a projection command unit for commanding a projection device to project the second image on the object; and an object information acquisition unit for acquiring information on the object based on a third image acquired by the image acquisition unit by imaging the object projected with the second image in accordance with a command of the imaging command unit using the imaging device.

Preferably, the projection command unit commands the projection device to project a fourth image where a predetermined shade value is set with respect to each pixel on the object before the imaging command unit commands the imaging device to image the object in order for the image acquisition unit to acquire the first image, and the imaging command unit commands the imaging device to image the object projected with the fourth image in order for the image acquisition unit to acquire the first image.

Preferably, the fourth image is an image where the same shade value that exceeds zero is set with respect to all pixels corresponding to a region containing the object.

Preferably, the forth image is the second image produced last time by the image production unit.

The image processing method according to the present invention is an image processing method for executing image processing using a processor to detect an object in an image imaged by an imaging device, the image processing method including a first imaging command step wherein the processor commands the imaging device to image the object; a first image acquisition step in which the processor acquires a first image imaged by the imaging device in accordance with a command in the first imaging command step; an image production step in which the processor produces a second image where any of shade values is set with respect to each pixel so as to have a brightness distribution opposite to a brightness distribution of the first image; a first projection command step in which the processor commands a projection device to project the second image on the object; a second imaging command step in which the processor commands the imaging device to image the object projected with the second image; a second image acquisition step in which the processor acquires a third image imaged by the imaging device in accordance with a command in the second imaging command step; and an object information acquisition step in which the processor acquires information on the object in the third image based on the third image.

Preferably, the image processing method according to the present invention further includes a second projection command step in which the processor commands the projection device to project a fourth image where a predetermined shade value is set with respect to each pixel on the object prior to the first imaging command step, and in the first imaging command step, the processor commands the imaging device to image the object projected with the fourth image.

Preferably, the fourth image is an image where the same shade value that exceeds zero is set with respect to all pixels corresponding to a region containing the object.

Preferably, the fourth image is the second image produced last time in the image production step.

According to the present invention, the brightness of an object in an image imaged by the imaging device does not vary according to the orientation of the object without a decrease in the contrast of the image.

DESCRIPTION OF THE DRAWINGS

These and other features and advantages of the present invention will be better understood by reading the following detailed description, taken together with the drawings in which:

FIG. 7 is a flowchart of an image processing method of the embodiment of the present invention.

DETAILED DESCRIPTION OF THE PREFERRED EMBODIMENT

The embodiment of the image processing device and the image processing method according to the present invention will now be described with reference to the accompanying drawings.

Figure 1:
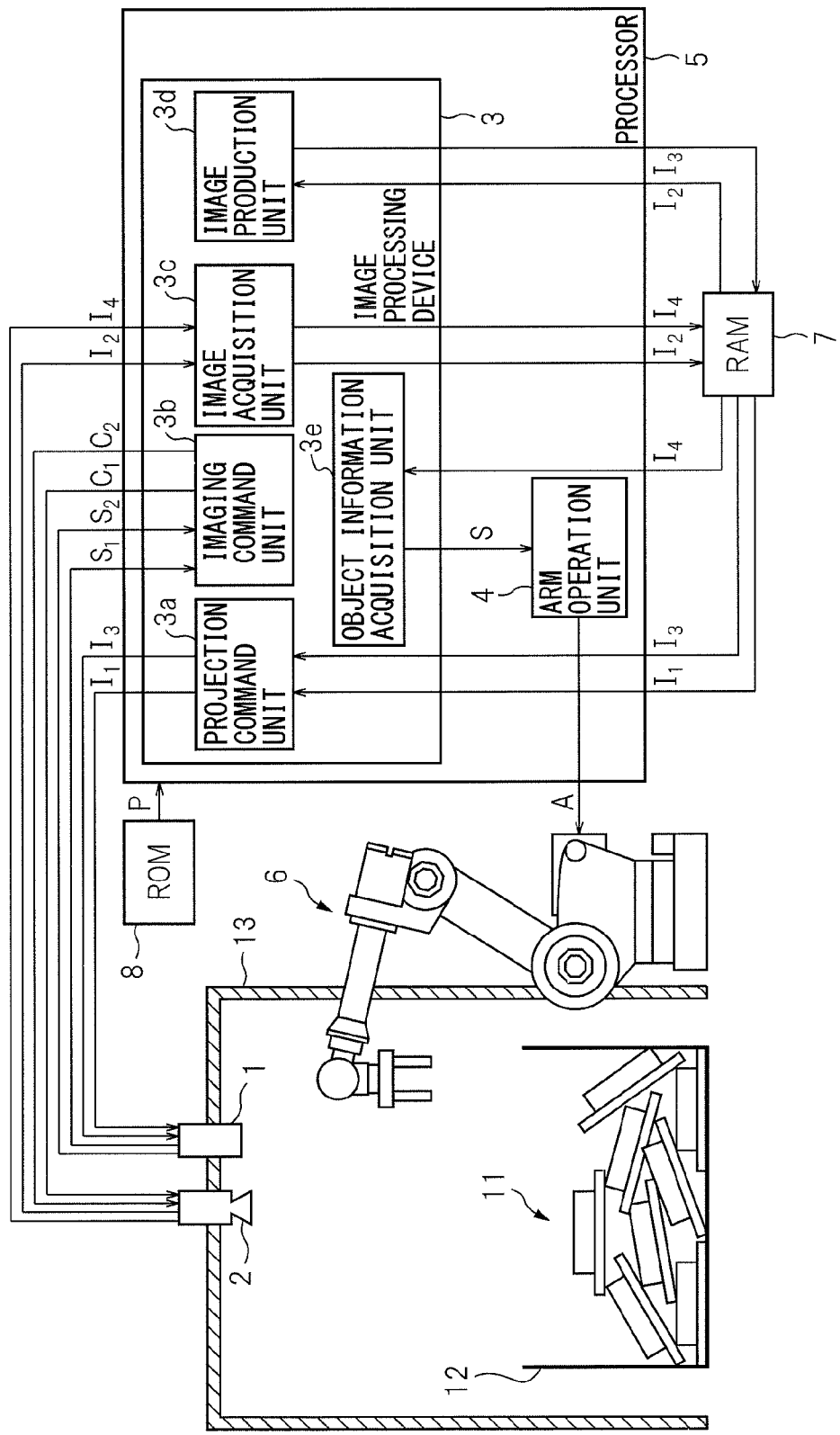
FIG. 1 is a block diagram of a system including an image processing device of an embodiment of the present invention.

FIG. 1 is a block diagram of a system including the image processing device of the embodiment of the present invention. The system illustrated in FIG. 1 includes a projection device 1, an imaging device 2, a processor 5 including an image processing device 3 and an arm operation unit 4, a robot 6, a RAM 7, and a ROM 8.

The projection device 1 includes a projector and others for projecting a shaded image having black and white shades. The projection device 1 is fixed to a frame 13 so as to project a shaded image on at least a part of a container 12 charged with a component group 11 as an object including a plurality of randomly piled components. A state of the component group 11 illustrated in FIG. 1 corresponds to a state of the component group at a first timing in a component pickup step.

The imaging device 2 includes a camera and others for producing a black and white shaded image. The imaging device 2 is fixed to the frame 13 so that a range where the projection device 1 projects a shaded image falls into a viewing field of the imaging device 2. In the present embodiment, an optical axis of the projection device 1 is substantially the same as an optical axis of the imaging device 2.

The image processing device 3 executes image processing such as template matching, edge detection, and others in order to detect the component group 11 contained in an image imaged by the imaging device 2. Therefore, the image processing device 3 includes a projection command unit $3a$, an imaging command unit $3b$, an image acquisition unit $3c$, an image production unit $3d$, and an object information acquisition unit $3e$.

The projection command unit $3a$ commands the projection device 1 to project a shaded image $I_1$ as a fourth image where a predetermined shade value is set with respect to each pixel on the component group 11. Therefore, the projection command unit $3a$ extracts the shaded image $I_1$ previously stored on the RAM 7 and feeds the shaded image $I_1$ to the projection device 1. The projection device 1, having been fed with the shaded image $I_1$ from the projection command unit $3a$, projects the shaded image $I_1$ on the component group 11. Therefore, the shaded image $I_1$ also has a role as a projection command for commanding the projection device 1 to project the shaded image $I_1$ on the component group 11. Further, upon starting projecting the shaded image $I_1$ on the component group 11, the projection device 1 outputs a projection start signal $S_1$ for indicating this fact to the imaging command unit $3b$.

Figure 2:
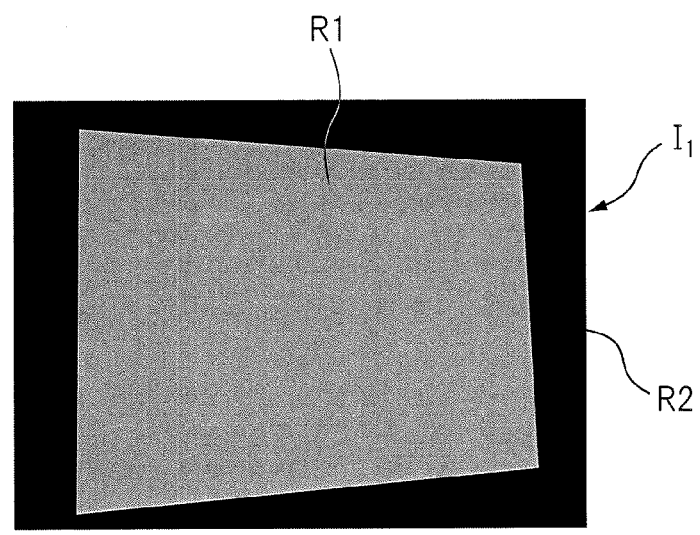
FIG. 2 is a view illustrating one example of an image for projection where a shade value that exceeds zero is set with respect to all pixels corresponding to a region containing an object.

The shaded image $I_1$ is an image where the same shade value that exceeds zero is set with respect to all pixels corresponding to a region containing the component group 11. FIG. 2 is a view illustrating one example of an image for projection where the same shade value that exceeds zero is set with respect to all pixels corresponding to a region containing the component group 11. In FIG. 2, the same shade value that exceeds zero is set with respect to all pixels corresponding to a region R1 containing the component group 11 in the shaded image and a shade value of zero (corresponding to black) is set with respect to all pixels corresponding to a region R2 other than the aforementioned region. When a shade value of zero is set with respect to all the pixels corresponding to the region R2 that does not contain the component group 11 in the shaded image $I_1$ in this manner, a position of the component group 11 is easily specified.

The imaging command unit $3b$ commands the imaging device 2 to image the component group 11 projected with the shaded image $I_1$. Therefore, the imaging command unit $3b$ issues an imaging command $C_1$ for commanding the imaging device 2 to image the component group 11 projected with the shaded image $I_1$ to the imaging device 2 in response to the projection start signal $S_1$. The imaging device 2 images the component group 11 projected with the shaded image $I_1$ in response to the imaging command $C_1$ and then feeds a shaded image $I_2$ as a first image imaged in response to the imaging command $C_1$ to the image acquisition unit $3c$.

The image acquisition unit $3c$ acquires the shaded image $I_2$ imaged by the imaging device 2 in accordance with a command of the imaging command unit $3b$. Therefore, the shaded image $I_2$ is fed from the imaging device 2 to the image acquisition unit 3c and then the fed shaded image $I_2$ is stored on the RAM 7 by the image acquisition unit 3c.

Figure 3:
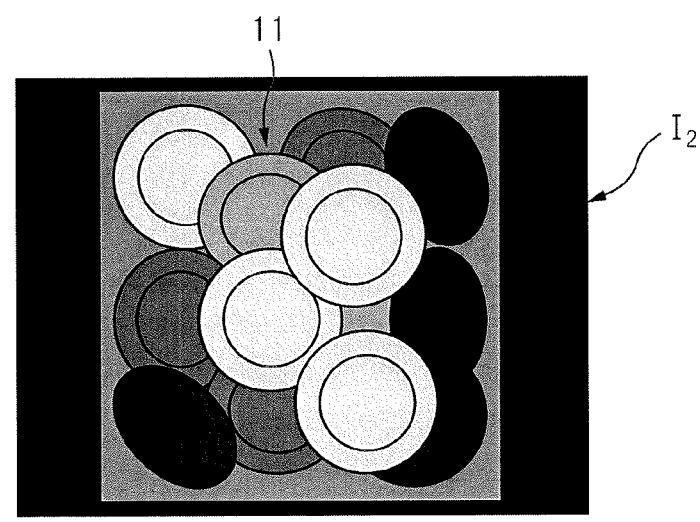
FIG. 3 is a view illustrating one example of an image acquired by imaging the object projected with the image for projection illustrated in FIG. 2.

FIG. 3 is a view illustrating one example of an image acquired by imaging the object projected with the image for projection illustrated in FIG. 2. A state of the component group 11 illustrated in FIG. 3 corresponds to a state of the component group at a second timing (differing from the first timing) in the component pickup step.

As illustrated in FIG. 3, of the components contained in the component group 11, the brightnesses of components having a face parallel to the imaging surface of the imaging device 2 are largest, and with an increase in face inclination to the imaging surface of the imaging device 2, the brightnesses of the components decrease.

The image production unit 3d produces a shaded image $I_3$ as a second image where any of shade values is set with respect to each pixel so as to have a brightness distribution opposite to a brightness distribution of the shaded image $I_2$. Therefore, upon fixing the projection device 1 and the imaging device 2 to the frame 13, the image production unit 3d previously determines a correspondent relationship between pixels of the shaded image $I_2$ and pixels of the shaded image $I_3$ and produces the shaded image $I_3$ based on the shaded image $I_2$ and the determined correspondent relationship.

When an optical axis of the projection device 1 is substantially the same as an optical axis of the imaging device 2 as illustrated in FIG. 1, a difference due to a difference between a placement position of the projection device 1 and a placement position of the imaging device 2 is not generated between the shaded image $I_2$ and the shaded image $I_3$. Therefore, when a shaded image indicating a brightness distribution generated based on the shaded image $I_2$ is simply enlarged or reduced and the brightness distribution is reversed, the shaded image $I_3$ is able to be produced.

In the present embodiment, the image production unit 3d produces the shaded image $I_3$ by applying filter processing to a shaded image $I_2'$ reduced based on the correspondent relationship determined as described above. The filter processing includes, as one example, lowpass filter processing using a Gaussian filter or the like to eliminate high frequency components. A size of the lowpass filter is determined based on, for example, a size of the viewing field of the imaging device 2 and a size of the component group 11 contained in the shaded image $I_2$.

Figure 4:
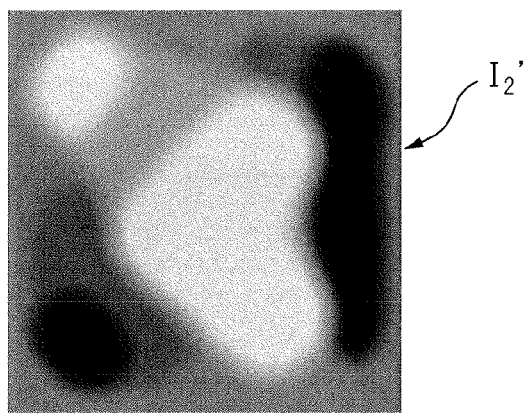
FIG. 4 is a view illustrating one example of an image indicating a brightness distribution of an image acquired by reducing the image illustrated in FIG. 3 based on a predetermined correspondent relationship.
Figure 5:
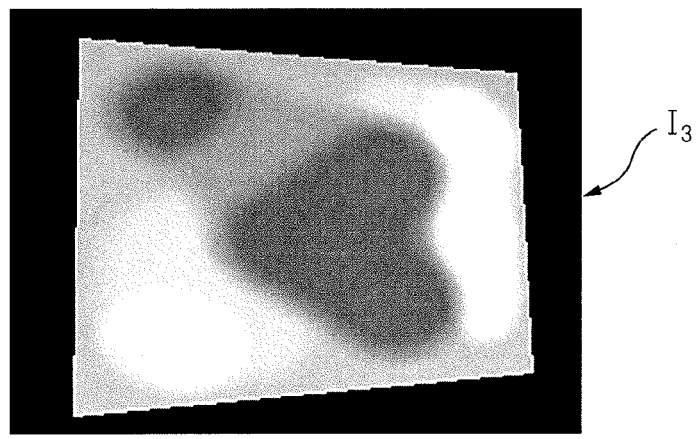
FIG. 5 is a view illustrating one example of an image for projection acquired by lowpass filter processing of the image illustrated in FIG. 4.

FIG. 4 is a view illustrating one example of an image indicating a brightness distribution of an image acquired by reducing the image illustrated in FIG. 3 based on a predetermined correspondent relationship. FIG. 5 is a view illustrating one example of an image for projection acquired by lowpass filter processing of the image illustrated in FIG. 4. A brightness distribution of the shaded image $I_2'$ illustrated in FIG. 4 corresponds to a brightness distribution of the shaded image $I_2$ illustrated in FIG. 3. A brightness distribution of the shaded image $I_3$ illustrated in FIG. 5 indicates a brightness distribution opposite to a brightness distribution of the shaded image $I_2'$ illustrated in FIG. 4.

Further, the projection command unit 3a commands the projection device 1 to project the shaded image $I_3$ on the component group 11. Therefore, the projection command unit 3a extracts the shaded image $I_3$ stored on the RAM 7 and feeds the shaded image $I_3$ to the projection device 1. The projection device 1 having been fed with the shaded image $I_3$ from the projection command unit 3a projects the shaded image $I_3$ on the component group 11. Therefore, the shaded image $I_3$ also has a role as a projection command for commanding the projection device 1 to project the shaded image $I_3$ on the component group 11. Further, upon starting projecting the shaded image $I_3$ on the component group 11, the projection device 1 outputs a projection start signal $S_2$ for indicating this fact to the imaging command unit 3b.

Further, the imaging command unit 3b commands the imaging device 2 to image the component group 11 projected with the shaded image $I_3$. Therefore, the imaging command unit 3b issues an imaging command $C_2$ for commanding the imaging device 2 to image the component group 11 projected with the shaded image $I_3$ to the imaging device 2 in response to the projection start signal $S_2$. The imaging device 2 images the component group 11 projected with the shaded image $I_3$ in response to the imaging command $C_2$ and then feeds a shaded image $I_4$ as a third image imaged in response to the imaging command $C_2$ to the image acquisition unit 3c.

Figure 6:
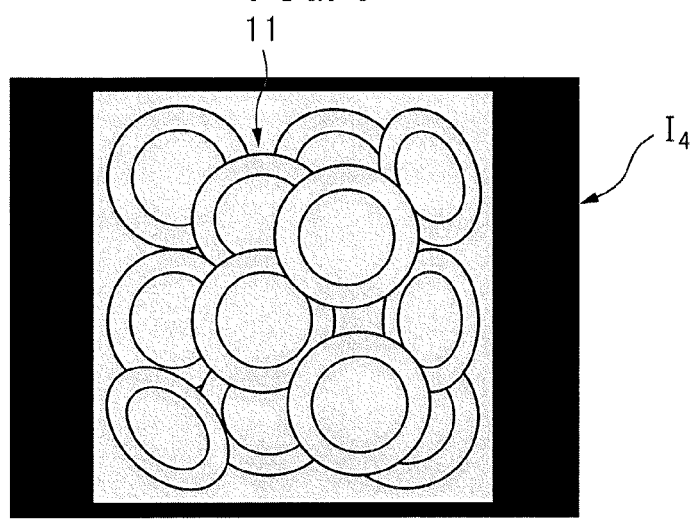
FIG. 6 is a view illustrating one example of an image acquired by imaging the object projected with the image for projection illustrated in FIG. 5.

FIG. 6 is a view illustrating one example of an image acquired by imaging an object projected with the image for projection illustrated in FIG. 5. As illustrated in FIG. 6, all the brightnesses of components contained in the component group 11 are substantially the same. In other words, a situation where the brightnesses of components contained in the shaded image $I_4$ excessively increase due to the fact that the faces of the components are parallel to the imaging surface of the imaging device 2 is not generated. On the other hand, a situation where the brightnesses of components contained in the shaded image $I_4$ excessively decrease due to the fact that the faces of the components are inclined to the imaging surface of the imaging device 2 is not generated. Further, the image acquisition unit 3c acquires the shaded image $I_4$ imaged by the imaging device 2 in accordance with a command of the imaging command unit 3b. Therefore, the shaded image $I_4$ is fed from the imaging device 2 to the image acquisition unit 3c and the fed shaded image $I_4$ is stored on the RAM 7 by the image acquisition unit 3c.

The object information acquisition unit 3e acquires information on the component group 11 contained in the shaded image $I_4$ based on the shaded image $I_4$. Therefore, the object information acquisition unit 3e executes image processing such as template matching, edge detection, and others and acquires object information S such as the position, shape, size, orientation, and others of each of a plurality of components contained in the component group 11 to feed the object information S to the arm operation unit 4.

The arm operation unit 4 generates an arm operation command A for operating an arm of the robot 6 based on the object information S and issues the arm operation command A to the robot 6. The processor 5 is disposed inside a robot controller not illustrated and realized by including an input/output port, a serial communication circuit, an A/D converter, and others not illustrated. The processor 5 executes various type of processing in accordance with a processing program P stored on the ROM 8. The robot 6 operates the arm to pick up one of the plurality of components contained in the component group 11 in accordance with the arm operation command A. As described above, the RAM 7 temporarily stores the shaded images $I_1$, $I_2$, $I_2'$, $I_3$, and $I_4$ during image processing executed by the image processing device 3. As described above, the ROM 8 stores the processing program P executed by the processor 5.

FIG. 7 is a flowchart of the image processing method of the embodiment of the present invention. This flowchart is executed by the image processing device 3 every time one of a plurality of components in the component group 11 is picked up during component pickup operations performed by the robot 6 and controlled by the processing program P stored on the ROM 8.

Initially, the projection command unit 3a extracts a shaded image $I_1$ previously stored on the RAM 7 and feeds the shaded image $I_1$ to the projection device 1 (S1). Subsequently, the imaging command unit 3b issues an imaging command $C_1$ for commanding the imaging device 2 to image the component group 11 projected with the shaded image $I_1$ to the imaging device 2, in response to a projection start signal $S_1$ (S2). Then, the image acquisition unit 3c acquires a shaded image $I_2$ imaged by the imaging device 2 in accordance with a command of the imaging command unit 3b and stores the acquired shaded image $I_2$ on the RAM 7 (S3). Then, the image production unit 3d produces a shaded image $I_3$ based on a correspondent relationship between pixels of an image projected from the projection device 1 and pixels of an image imaged by the imaging device 2 previously determined upon fixing the projection device 1 and the imaging device 2 to the frame 13 and the shaded image $I_2$ (S4). Then, the projection command unit 3a extracts the shaded image $I_3$ stored on the RAM 7 and feeds the shaded image $I_3$ to the projection device 1 (S5). Then, the imaging command unit 3b issues an imaging command $C_2$ for commanding the imaging device 2 to image the component group 11 projected with the shaded image $I_3$ to the imaging device 2, in response to a projection start signal $S_2$ (S6). Then, the image acquisition unit 3c acquires a shaded image $I_4$ imaged by the imaging device 2 in accordance with a command of the imaging command unit 3b and stores the acquired shaded image $I_4$ on the RAM 7 (S7). Then, the object information acquisition unit 3e executes image processing such as template matching, edge detection, and others and acquires object information S such as the position, shape, size, orientation, and others of each of a plurality of components contained in the component group 11 to feed the object information S to the arm operation unit 4 (S8), and then the present routine ends.

According to the present embodiment, when the shaded image $I_3$ is projected on the component group 11, a plurality of components in the component group 11 are illuminated at an appropriate brightness level based on the inclination of the faces of the components with respect to the imaging surface of the imaging device 2. Thereby, the brightnesses of a plurality of components in the component group 11 contained in the shaded image $I_4$ do not vary according to the object orientation. Therefore, neither halation nor a dark portion is generated in the shaded image $I_4$ and then the shaded image $I_4$ results in an image with a sharpened shade variation. Further, no decrease in the contrast of the shaded image $I_4$ occurs since the dynamic range is not widened. Still further, since shaded image projection and shaded image imaging each are performed twice, it is possible to reduce the processing time compared with the case of exposure or imaging performed for a plurality of exposure times as conventionally performed. Furthermore, in the present embodiment, since the shaded image $I_4$ with a sharpened shade variation is used as described above, it is possible to easily perform detection and others of the component group 11.

The present invention is not limited to the embodiment and various changes and modifications thereof can be made. In the embodiment, the case where the image processing device according to the present invention is applied to a robot has been described. However, for example, the image processing device according to the present invention is applicable to devices other than the robot.

In the embodiment, the case where the image processing device 3 and the arm operation unit 4 are realized using a single processor 5 inside the robot controller has been described. However, it is also possible that the image processing device 3 and the arm operation unit 4 can be realized by using separate processors inside the robot controller.

In the embodiment, the case where the image processing device 3 is disposed in the robot controller has been described. However, it is also possible that the image processing device 3 can be disposed in the projection device 1 or the imaging device 2. When the image processing device 3 is disposed in the projection device 1, the projection command unit 3a issues a projection command to the projection device 1 itself. On the other hand, when the image processing device 3 is disposed in the imaging device 2, the imaging command unit 3b issues an imaging command to the imaging device 2 itself.

In the embodiment, the case where the projection device 1 includes no controller has been described. However, the projection device 1 possibly includes a controller. When the projection device 1 includes a controller, the controller performs a projection operation in accordance with a projection command issued by the projection command unit 3a.

In the embodiment, the case where the imaging device 2 includes no controller has been described. However, the imaging device 2 possibly includes a controller. When the imaging device 2 includes a controller, the controller performs an imaging operation in accordance with an imaging command issued by the imaging command unit 3b. Further, the projection device 1 possibly includes a memory for temporarily storing the shaded images $I_1$ and $I_3$. The imaging device 2 possibly includes a memory for temporarily storing the shaded images $I_2$ and $I_4$.

In the embodiment, the case where a black and white shaded image is used has been described. However, a shaded image of each color of a color image is employable. In the embodiment, the case where the imaging device 2 directly acquires a shaded image has been described. However, it is also possible that the imaging device 2 includes a black and white camera or a color camera and the image processing device 3 processes an image imaged using the black and white camera or the color camera to acquire a shaded image.

In the embodiment, there has been described the case where the object information acquisition unit 3e acquires object information S such as the position, shape, size, orientation, and others of each of a plurality of components contained in the component group 11 and feed the object information S to the arm operation unit 4. However, it is also possible that any one of the object information acquisition unit 3e and the arm operation unit 4 is allowed to inspect each of a plurality of components contained in the component group 11 based on the shaded image $I_4$.

In the embodiment, there has been described the case where the projection command unit 3a for commanding the projection device 1 to project the shaded image $I_1$ on the component group 11 is provided and the imaging command unit 3b commands the imaging device 2 to image the component group 11 projected with the shaded image $I_1$. However, it is also possible that the projection of the shaded image $I_1$ on the component group 11 is omitted and the imaging command unit 3b commands the imaging device 2 to image the component group 11.

In the embodiment, the case where an image in which a shade value that exceeds zero is set with respect to all pixels corresponding to a region contained in the component group 11 is used as the shaded image $I_1$ has been described. However, when the shaded image $I_3$ is stored on the RAM 7, in other words, when the image production unit 3d has produced the shaded image $I_3$ upon acquiring the object information S last time, the shaded image $I_3$ is usable as the shaded image $I_1$. When the shaded image $I_3$ produced last time is projected on the component group 11 in this manner, a plurality of components in the component group 11 are illuminated at a brightness level with consideration of the inclination of the faces of the components with respect to the imaging surface of the imaging device 2. Thereby, it is possible to reduce the variation of the brightnesses of a plurality of components in the component group 11 contained in the shaded mage $I_3$ according to the object orientation. Therefore, it is possible to simplify processing for obtaining the shaded image $I_4$ with a sharpened shade variation.

In the embodiment, the case where the projection device 1 and the imaging device 2 are fixed to the frame 13 has been described. However, it is also possible that the projection device 1 and the imaging device 2 can be mounted in a tip of the arm of the robot 6 and the tip of the arm of the robot 6 is disposed above the container 12 upon acquiring the object information S.

In the embodiment, the case where an optical axis of the projection device 1 is substantially the same as an optical axis of the imaging device 2 has been described. However, the present invention is applicable to a case where the optical axis of the projection device 1 is the same as the optical axis of the imaging device 2 or the optical axis of the projection device 1 is not the same as the optical axis of the imaging device 2. When the optical axis of the projection device 1 is not the same as the optical axis of the imaging device 2, it is possible to geometrically determine the correspondent relationship between pixels of the shaded image $I_2$ and pixels of the shaded image $I_3$ based on a relative position relationship between the shaded image $I_2$ and the shaded image $I_3$. In this case, center projection is preferably performed but it is possible to express the correspondent relationship between pixels of the shaded image $I_2$ and pixels of the shaded image $I_3$ using two-dimensional geometric transformation such as affine transformation and the like. In use of affine transformation, it is possible to express, as described below, a relationship between pixels $P_a$ of the shaded image $I_2$ and pixels $P_b$ of the shaded image $I_3$ using a matrix A of 3 rows and 3 columns.

$$P_a = A \times P_b$$

When distortion of the component group 11 contained in the shaded image $I_3$ resulting from the optical system of the imaging device 2 is problematic, the correspondent relationship between pixels of the shaded image $I_2$ and pixels of the shaded image $I_3$ is determined with consideration of such distortion.

In the embodiment, there has been described the case where filter processing is applied to the shaded image $I_2{'}$ reduced based on the correspondent relationship between pixels of the shaded image $I_2$ and pixels of the shaded image $I_3$ to produce the shaded image $I_3$. However, it is also possible that the brightness of each pixel of the shaded image $I_1$ is determined and the brightness of each pixel of the shaded image $I_3$ is determined based on the correspondent relationship between pixels of the shaded image $I_2$ and pixels of the shaded image $I_3$ and whether the brightness of each pixel of the shaded image $I_2$ is larger than a predetermined brightness to produce the shaded image $I_3$. For example, when the brightness of a pixel i of the shaded image $I_1$ is designated as $F_i$, the brightness of a pixel of the shaded image $I_2$ corresponding to the pixel i is designated as $G_i$, and a predetermined brightness is designated as $G_0$, the brightness $H_i$ of the shaded image $I_3$ corresponding to the pixel i can be determined using the following expression.

$$H_i = F_i \times (G_0 / G_i)$$

What is claimed is:

1. An image processing device executing image processing in order to detect an object in an image imaged by an imaging device, comprising:
   an imaging command unit for commanding the imaging device to image the object;
   an image acquisition unit for acquiring a first image imaged by the imaging device in accordance with a command of the imaging command unit;
   an image production unit for producing a second image where any of shade values is set with respect to each pixel so as to have a brightness distribution opposite to a brightness distribution of the first image, based on the first image;
   a projection command unit for commanding a projection device to project the second image on the object; and
   an object information acquisition unit for acquiring information on the object based on a third image acquired by the image acquisition unit by imaging the object projected with the second image using the imaging device in accordance with a command of the imaging command unit.

2. The image processing device according to claim 1, wherein the projection command unit commands the projection device to project a fourth image where a predetermined shade value is set with respect to each pixel on the object before the imaging command unit commands the imaging device to image the object, in order that the image acquisition unit acquires the first image;
   and the imaging command unit commands the imaging device to image the object projected with the fourth image, in order that the image acquisition unit acquires the first image.

3. The image processing device according to claim 2, wherein the fourth image is an image where the same shade value exceeding zero is set with respect to all pixels corresponding to a region containing the object.

4. The image processing device according to claim 2, wherein the fourth image is a second image produced last time by the image production unit.

5. An image processing method executing image processing using a processor in order to detect an object in an image imaged by an imaging device, comprising:
   a first imaging command step wherein the processor commands the imaging device to image the object;
   a first image acquisition step wherein the processor acquires a first image imaged by the imaging device in accordance with a command in the first imaging command step;
   an image production step in which the processor produces a second image where any of shade values is set with respect to each pixel so as to have a brightness distribution opposite to a brightness distribution of the first image;
   a first projection command step in which the processor commands a projection device to project the second image on the object;
   a second imaging command step in which the processor commands the imaging device to image the object projected with the second image;
   a second image acquisition step in which the processor acquires a third image imaged by the imaging device in accordance with a command in the second imaging command step; and
   an object information acquisition step in which the processor acquires information on the object in the third image based on the third image.

6. The image processing method according to claim 5, further comprising:
   a second projection command step in which the processor commands the projection device to project a fourth image where a predetermined shade value is set with respect to each pixel on the object prior to the first imaging command step, the processor commanding the imaging device to image the object projected with the fourth image in the first imaging command step.

7. The image processing method according to claim 6, wherein the fourth image is an image where the same shade value exceeding zero is set with respect to all pixels corresponding to a region containing the object.

8. The image processing method according to claim 6, wherein the fourth image is a second image produced last time in the image production step.

\* \* \* \* \*